United States Patent

Law et al.

[11] Patent Number: 5,281,503
[45] Date of Patent: Jan. 25, 1994

[54] COUPLERS FOR PHOTOGENERATING AZO PIGMENTS

[75] Inventors: Kock-Yee Law, Penfield; Ihor W. Tarnawskyj, Rochester, both of N.Y.

[73] Assignee: Xerox Corporation, Stamford, Conn.

[21] Appl. No.: 870,387

[22] Filed: Apr. 17, 1992

[51] Int. Cl.$^5$ ............................................. G03G 5/06
[52] U.S. Cl. ........................................ 430/58; 430/73; 430/76; 430/78
[58] Field of Search ................. 430/73, 76, 78, 58

[56] References Cited

U.S. PATENT DOCUMENTS

| | | | |
|---|---|---|---|
| 3,121,006 | 2/1964 | Middleton et al. | 430/90 |
| 3,121,007 | 2/1964 | Middleton et al. | 430/90 |
| 3,574,181 | 4/1971 | Forter et al. | 260/152 |
| 3,971,741 | 7/1976 | Dehmel et al. | 260/173 |
| 4,251,612 | 2/1981 | Chu et al. | 430/59 |
| 4,265,990 | 5/1981 | Stolka et al. | 430/59 |
| 4,341,701 | 7/1982 | Pechey et al. | 260/161 |
| 4,418,133 | 11/1983 | Katagiri et al. | 430/58 |
| 4,469,515 | 9/1984 | Pechey et al. | 106/23 |
| 4,540,651 | 9/1985 | Fujimaki et al. | 430/72 |
| 4,612,271 | 9/1986 | Makino et al. | 430/72 |
| 4,618,672 | 10/1986 | Hashimoto | 534/658 |
| 4,619,878 | 10/1986 | Hashimoto | 430/56 |
| 4,663,442 | 5/1987 | Ohta | 534/759 |
| 4,666,805 | 5/1987 | Hashimoto | 430/57 |
| 4,708,921 | 11/1987 | Hashimoto | 430/70 |
| 4,735,882 | 4/1988 | Yamashita et al. | 430/58 |
| 4,797,337 | 1/1989 | Law et al. | 430/58 |
| 4,912,001 | 3/1990 | Kouno et al. | 430/71 |
| 5,077,161 | 12/1991 | Law | 430/78 |

FOREIGN PATENT DOCUMENTS

| | | |
|---|---|---|
| 0322823A3 | 5/1989 | European Pat. Off. |
| 93302667 | 8/1993 | European Pat. Off. |
| 3149685A1 | 7/1982 | Fed. Rep. of Germany |
| 3211299A1 | 10/1982 | Fed. Rep. of Germany |
| 3521652A1 | 12/1985 | Fed. Rep. of Germany |
| 3522896A1 | 2/1986 | Fed. Rep. of Germany |
| 3602987A1 | 10/1986 | Fed. Rep. of Germany |

*Primary Examiner*—John Goodrow

[57] ABSTRACT

A photogenerating pigment has the formula:

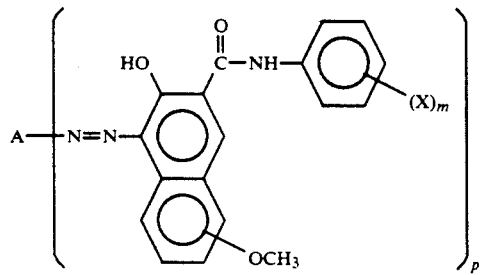

wherein A is the residual structure of an aromatic amine, p is an integer 1, 2, 3, 4, etc. depending on the amine structure, m is an integer 0, 1, 2, 3, or 4 and X may be selected from the group including but not limited to F, Cl, Br, $NO_2$, CN, OH, $NH_2$, $OCH_3$, $OCH_2CH_3$, $CF_3$, alkyl and aromatic groups.

17 Claims, 2 Drawing Sheets

COUPLERS FOR PHOTOGENERATING AZO PIGMENTS

FIELD OF THE INVENTION

This invention relates to photogenerating azo pigments for use in the photogenerating layer of image receptors in imaging devices.

BACKGROUND OF THE INVENTION

Electrostatographic imaging systems involve the formation and development of electrostatic latent images. In some such imaging systems, a photoconductive insulating layer is imaged by uniformly electrostatically charging its surface, followed by exposing the surface to a pattern of activating electromagnetic radiation such as light, thereby selectively dissipating the charge in the illuminated areas to cause a latent electrostatic image to be formed in the non-illuminated areas.

This latent electrostatic image can be developed with developer compositions containing toner particles, followed by transferring the developed image to a suitable substrate such as paper.

Many photoconductive members are known. For example, photoconductive insulating materials can be deposited on conductive substrates. They often contain a thin barrier layer of a charge blocking material such as aluminum oxide between the substrate and the photoconductive composition. The barrier layer is primarily for the purpose of preventing charge injection from the substrate into the photoconductive layer subsequent to charging, as injection could adversely affect the electrical properties of a photoconductive member.

Examples of photoconductive members include those comprised of a homogeneous layer of inorganic or organic photoconductive compositions, composite layered devices containing photoconductive substances dispersed in other materials, and the like. An example of one type of composite photoconductive layer is described, for example, in U.S. Pat. No. 3,121,006, which discloses finely divided particles of a photoconductive inorganic compound dispersed in an electrically insulating organic resin binder. In one form, the photoconductive composition involved is comprised of a paper backing containing a coating thereon of a binder layer comprised of particles of zinc oxide uniformly dispersed therein. Useful binder materials disclosed include those which are incapable of transporting for any significant distance injected charge carriers generated by the photoconductive particles. The photoconductive particles must be in substantially contiguous particle to particle contact throughout the layer for the purpose of permitting charge dissipation for a cyclic operation. Thus, about 50 percent by volume of photoconductive particles is usually necessary in order to obtain sufficient photoconductor particle to particle contact for rapid discharge. These high photoconductive particle concentrations can destroy the physical continuity of the resin particles, thus significantly reducing the mechanical strength of the binder layer.

Illustrative examples of specific binder materials disclosed in U.S. Pat. No. 3,121,006 include, for example, polystyrene resins, silicone resins, acrylic and methacrylic ester polymers, polymerized ester derivatives of acrylic and alpha-acrylic acids, chlorinated rubber, vinyl polymers and copolymers, and cellulose esters.

In devices employing photoconductive binder structures which include inactive electrically insulating resin such as those described in U.S. Pat. No. 3,121,006, conductivity or charge transport is accomplished through high loadings of the photoconductive pigment and allowing particle-to-particles contact of the photoconductive particles. In the case of photoconductive particles dispersed in a photoconductive matrix, such as illustrated by U.S. Pat. No. 3,121,007, photoconductivity occurs through the generation and transport of charge carriers in both the photoconductive matrix and the photoconductive pigment particles.

Known photoconductive compositions include amorphous selenium, halogen doped amorphous selenium substances, amorphous selenium alloys, including selenium arsenic, selenium tellurium, selenium arsenic antimony, halogen doped selenium alloys, wherein the halogen may be chlorine, iodine, or fluorine, cadmium sulfide, and the like. Generally, these photoconductive materials are deposited on suitable conductive substrates in xerographic imaging systems.

Imaging members wherein the charge generating and charge transport functions are accomplished by discrete contiguous layers are also known, such as those described in U.S. Pat. No. 4,265,990. Photoresponsive materials containing a hole injecting layer overcoated with a hole transport layer, followed by an overcoating of a photogenerating layer, and a top coating of an insulating organic resin, are disclosed in U.S. Pat. No. 4,251,612. Examples of such photogenerating layers include trigonal selenium and phthalocyanines, while examples of such transport layers include certain aryl diamines. The disclosures of U.S. Pat. Nos. 4,265,990 and 4,251,612 are hereby totally incorporated herein by reference.

U.S. Pat. No. 3,574,181 discloses disazo compounds useful as coloring agents. These compounds include halogen substituents on the central aromatic groups.

Composite electrophotographic photosensitive materials containing various azo compounds are disclosed in U.S. Pat. No. 4,618,672, wherein diazo compounds particularly suitable for use in the charge generating layer of a layered electrophotographic photoconductor are illustrated.

U.S. Pat. No. 4,540,651 discloses an electrophotographic photosensitive member with high sensitivity which is capable of forming consistently good images. The member is comprised of a carrier generating layer and a carrier transporting layer on an electroconductive support. The carrier generating layer contains a diazo compound, and the carrier transporting layer contains a styryl compound and/or an amine derivative, a hydrazone compound or a carbazole derivative. Many diazo compounds used comprise a 2-hydroxy-3-naphthanilide coupler.

U.S. Pat. No. 4,612,271 discloses a photosensitive composition comprising azo compounds which can be applied to electrophotographic photoconductive materials. The azo compounds are comprised of a carboxamide with a polycyclo ring substituent containing a hydroxyl group bonded to the same ring as a chalcogen. The photosensitive composition is said to have an extremely high photosensitivity, and excellent chargeability.

U.S. Pat. No. 4,663,442 discloses a diazo compound for use as a charge generating material in a photosensitive layer of an electrophotographic element. The diazo compound has the general formula

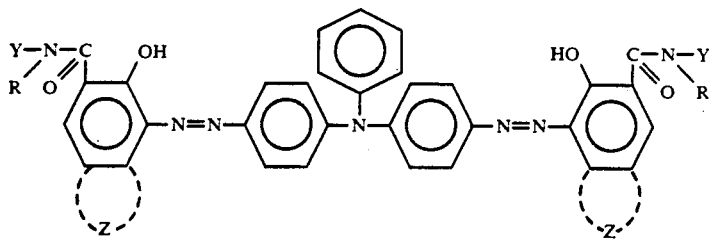

wherein Y represents a substituted or non-substituted cyclic hydrocarbon or a substituted or non-substituted heterocycle; R represents hydrogen, or a substituted or non-substituted phenyl group; and Z represents a substituted or non-substituted heterocycle fused with a phenyl nucleus.

U.S. Pat. Nos. 4,341,701 and 4,469,515 disclose a process for the synthesis of monoazo or diazo pigments. The method involves the combination of a coupling component and a diazonium and/or tetrazonium salt of an aromatic or heterocyclic amine. The resultant products of the combination are used to prepare the corresponding monoazo or diazo pigment. The products prepared in this fashion exhibit increased coloring strength, improved transparency and flow properties, and a higher degree of dispersibility.

U.S. Pat. No. 4,797,337 discloses photoconductive imaging members comprising a supporting substrate, a hole transport layer, and a photogenerating layer comprising disazo compounds selected from the group consisting of:

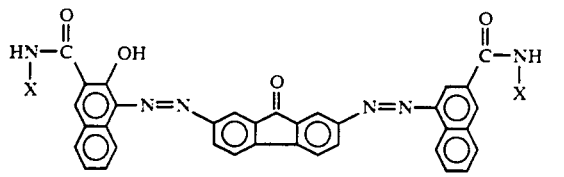

wherein X is selected from the group consisting of:

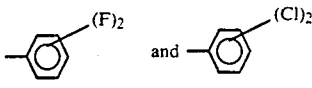

and

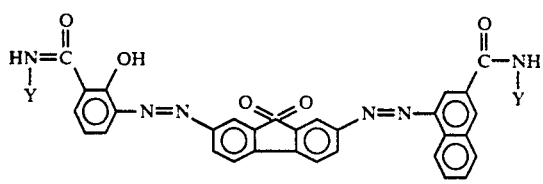

wherein Y is selected from the group consisting of:

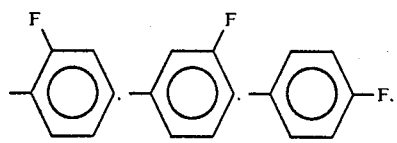

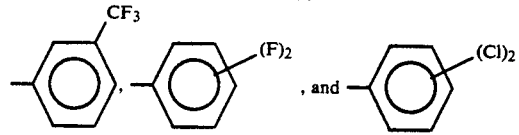

The photoconductive imaging members possess high cyclic stability, high photosensitivity, good dark development potential, low dark decay values and excellent panchromaticity. They are non-toxic and may be made inexpensively, which renders them disposable.

SUMMARY OF THE INVENTION

Azo pigments of the present invention comprise a methoxy coupling compound having the formula:

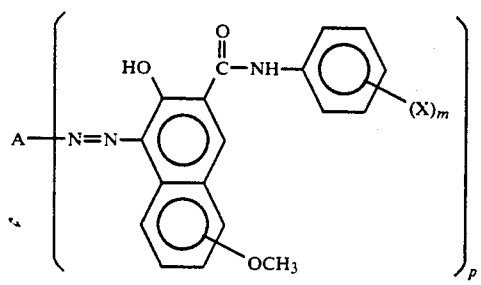

wherein A is the residual structure of an aromatic amine, p is an integer 1, 2, 3, 4, etc. depending on the aromatic amine structure, X is an organic or inorganic substituent, and m is an integer which may be 0, 1, 2, 3, or 4. Such pigments may be used in a photogenerating layer of a photoconductive imaging member comprising a supporting substrate, the photogenerating layer, and a charge transport layer. They are non-toxic and inexpensive, and imaging members containing them have high cyclic stability, high photosensitivity, low dark decay, and excellent panchromaticity. They have excellent sensitivity to long light wavelengths.

DESCRIPTION OF PREFERRED EMBODIMENTS

Figure 1:
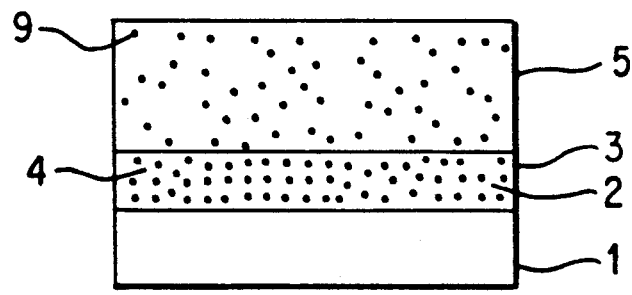
FIGS. 1, 2 and 3 are partially schematic cross-sectional views of photoconductive imaging members of the present invention.

This invention relates to a class of azo pigments formed from methoxy substituted azoic couplers. The azo pigments may be used as photogenerators in xerographic photoreceptors. The methoxy substituted azoic couplers increase the sensitivity of the photogenerating azo pigments.

The methoxy coupler has the general formula referred to herein as formula I:

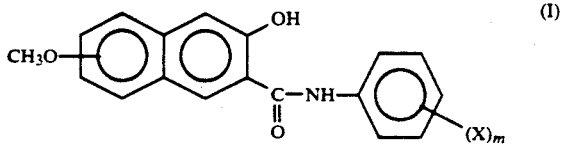

wherein X may preferably be one or more of F, Cl, Br, NO₂, CN, OH, NH₂, OCH₃, OCH₂CH₃, CF₃, or alkyl and/or aromatic groups, and m is an integer which may be 0, 1, 2, 3, or 4. The methoxy group is positioned on the 5th, 6th, 7th or 8th carbon in the second ring of the naphthanilide.

To produce an azo pigment of the invention, the methoxy coupler is attached to an aromatic amine. The resulting azo pigment has the general formula referred to herein as formula II:

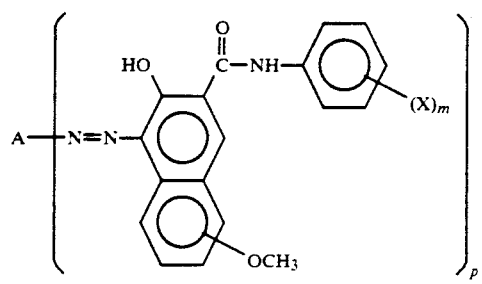

wherein A is the residual structure of an aromatic amine, and p, m and X are as defined above.

Preferred aromatic amines include but are not limited to 2,7-diaminofluorenone, 2,7-diamino-3,6-dichlorofluorenone, tris(p-aminophenyl)amine, bis(p-aminophenyl)phenylamine, 2-nitro-4,4'-diaminophenylamine, bis(p-aminophenyl)methylamine. bis(p-aminophenyl)amine, 1,5-diaminonaphthalene, 2,7-diaminonaphthalene, 2,7-diaminobenzothiophene sulfone, 2,7-diamino-3,6-dichlorobenzothiophene sulfone, 4,4'-diaminobiphenyl, 3,3'-dichloro-4,4'-diaminobiphenyl, 3,3'-dimethoxy-4,4'-diaminobiphenyl, 4,4'-diaminoterphenyl, 4,4'-diaminoazobenzene, 4,4'-diaminostilbene, 3,6-diaminocarbazole, N-ethyl-3,6-diaminocarbazole, 4,4'-diamino-1,1'-dianthraquinonylamine, 1,5-diaminoanthraquinone, 2,7-diaminoanthraquinone, 2,6-diaminoanthraquinone, 2,4,7-triaminofluorenone, 2,4,5,7-tetraaminofluorenone, 2,5-bis(4-aminophenyl)-1,3,4-oxadiazole, 2,7-diaminoxanthone, 2,7-diaminothioxanthone, 2,7-diaminofluoren-9-thione, 2,7-diaminobenzothiophene, N-(p-aminophenyl)-3,6-diaminocarbazole, 3,6-thioxanthenediamine-10,10-dioxide, 2,4,7-triaminofluorene-9-thione, N,N,N',N'-tetrakis(aminophenyl)-p-phenylenediamine, N,N,N',N'-tetrakis(aminophenyl)-4,4'-diaminobiphenyl, 2,7-diaminofluorene, N,N'-bis(aminophenyl)-3,4,9,10-perylene-tetracarboxylic diimide, and N,N'-bis(aminophenyl)-1,4,5,8-naphthalene-tetracarboxylic diimide.

In addition to the formation of mono and bisazo pigments, trisazo pigments can be synthesized. For example, tris(p-aminophenyl)amine and a coupler of the present invention, such as 2-hydroxy-methoxy-3-napthanilide, can be combined through a series of reactions to form a trisazo pigment.

The methoxy coupler allows for the synthesis of pigments which are non-toxic, inexpensive, and have high cyclic stability. The pigments possess the advantages of having high photosensitivity, low dark decay values and greater sensitivity to longer light wavelengths, up to and including light wavelengths of about 660 nms, in contrast to pigments without the methoxy group which have a maximum sensitivity at 600 nm. Furthermore, the pigments of this invention have significant photoresponse beyond 660 nms up to 700 nms in contrast to pigments without the methoxy group which are characterized by substantial decreasing sensitivity beyond 600 nm. This improved sensitivity is a particular advantage in some applications. For example, LED (light emitting diode) is a popular light source for printers because of low cost. An LED operates at wavelengths of about 660 to 680 nm. The pigments of the present invention, characterized by the methoxy coupler, are more compatible to the wavelengths of the light emitting diode than similar pigments without the characterizing methoxy group. Furthermore, for a given wavelength, the methoxy group characterized pigments of the present invention are more sensitive than the similar compounds.

The pigments of this invention can be incorporated into the photogenerating layer in a variety of photoconductive imaging members.

FIG. 1 illustrates a photoconductive imaging member of the present invention comprising a supporting substrate 1, a photogenerating layer 3 comprising an azo pigment 2 of the invention optionally dispersed in a resinous binder composition 4, and a charge transport layer 5, which comprises charge transporting molecules 9 dispersed in an inactive resinous binder composition.

Figure 2:
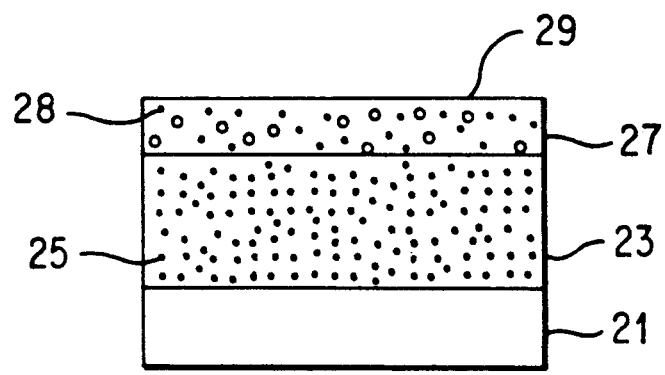

FIG. 2 illustrates a similar imaging member wherein the charge transport layer 23 is situated between the supporting substrate 21 and the photogenerating layer 27. The charge transport layer 23 comprises charge transport molecules 25 dispersed in an inactive resinous binder compositions The photogenerating layer 27 comprises particles 28 of an azo compound of the invention optionally dispersed in a resinous binder composition 29.

Figure 3:
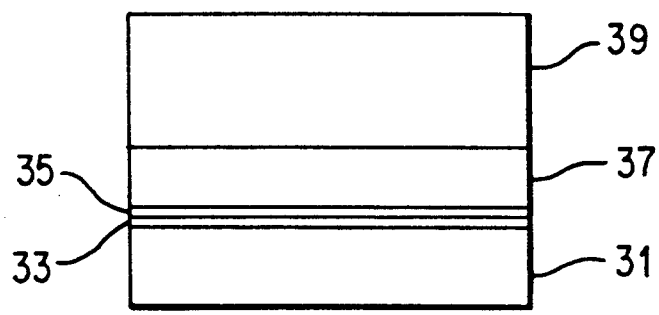

FIG. 3 illustrates another photoconductive imaging member of the present invention comprising a supporting substrate 31, optional hole blocking layer 33, an optional adhesive layer 35, an azo photogenerating layer 37 comprising an azo compound of the invention, and an aryl amine hole transport layer 39. The azo compound is optionally dispersed in a resinous binder composition, and similarly the hole transport molecules of the charge transport layer, such as aryl amines, are dispersed in inactive resinous binder materials.

The supporting substrate of the imaging members may comprise any suitable insulating material such as an inorganic or organic polymeric material, including Mylar ®, a commercially available polyethylene terephthalate, a layer of an organic or inorganic material having a semiconductive surface layer such as indium tin oxide or aluminum arranged thereon; or a conductive material such as aluminum, chromium, nickel, brass or the like. The substrate may be flexible or rigid and may have a number of different configurations, such as a plate, a cylindrical drum, a scroll, an endless flexible belt, and the like. Preferably, the substrate is in the form of an endless flexible belt. In some situations, it may be desirable to coat an anti-curl layer, such as a layer of polycarbonate materials commercially available as Makrolon ®, on the back of the substrate, particularly when the substrate is an organic polymeric material.

The thickness of the substrate layer depends on many factors, including economic considerations. Thus, this layer may be of substantial thickness, for example over 100 mils, or of minimal thickness provide that there are no adverse effects on the system. In a preferred embodiment, the thickness of this layer is from about 3 mils to about 10 mils.

The photoconductive imaging member may optionally contain a hole blocking layer 33 situated between the supporting substrate and the photogenerating layer. This layer may comprise metal oxides, such as aluminum oxide and the like, or materials such as silanes. The primary purpose of this layer is to prevent hole injection from the substrate during and after charging. Typically, this layer is of a thickness of less than 50 Angstroms, although it may be as thick as 500 Angstroms in some instances.

The photoconductive imaging member may also optionally contain an adhesive layer 35 situated between the hole blocking layer 33 and the photogenerating layer 37. This layer 35 may comprise a polymeric material such as polyester, polyvinyl butyral, polyvinyl pyrrolidone and the like. Typically, this layer is of a thickness of less than about 0.6 micron.

The photogenerating layer 37 contains an azo pigment of Formula II. Generally, this layer has a thickness of from about 0.05 micron to about 10 microns or more, and preferably has a thickness of from about 0.1 micron to about 3 microns. The minimum thickness of this layer is dependent primarily upon the photogenerating pigment weight loading, which may vary from about 5 to 100 percent by weight of the layer 37. Generally, it is desirable to provide this layer in a thickness sufficient to absorb about 90 percent or more of the incident radiation which is directed upon it in an imagewise or printing exposure step. The maximum thickness of this layer is dependent primarily upon factors such as mechanical considerations, including but not limited to the specific azo compound selected, the thicknesses of the other layers, and whether a flexible conductive imaging member is desired.

The hole transport layer 39 preferably comprises aryl amine molecules dispersed in a resinous binder. Preferred aryl amine compounds include those of the formula:

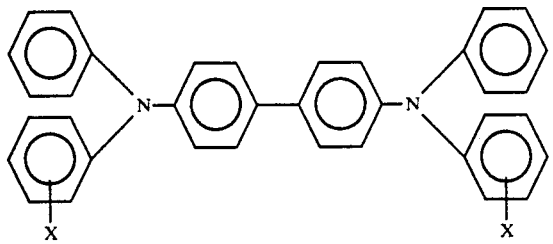

wherein X is selected from the group consisting of alkyl and halogen. Preferably, X is selected from the group consisting of methyl and chloride in either the ortho, meta, or para positions.

Compounds corresponding to the above formula include N,N'-diphenyl-N,N'-bis(alkylphenyl)-[1,1-biphenyl]-4,4'-diamine, wherein alkyl is selected from the group consisting of methyl, such as 2-methyl, 3-methyl and 4-methyl, ethyl, butyl, propyl hexyl and the like. With halo substitution the amine is N,N'-diphenyl-N,N'-bis(halo phenyl)-[1,1'-biphenyl]-4,4'-diamine, wherein halo is preferably 2-chloro, 3-chloro or 4-chloro. Other electrically active small molecules that can be dispersed in the electrically inactive resin to form a layer which will transport holes include bis(4-diethylamino-2-methylphenyl)-phenyl methane, 4',4"-bis(-diethylamino)-2',2"-dimethyltriphenyl methane, bis-4-(diethylaminophenyl)phenyl methane, and 4,4'-bis(diethylaminophenyl)phenyl methane, and 4,4'-bis(diethylamino)-2,2'-dimethyltriphenyl methane.

Suitable inactive binder materials for the hole transport layer include highly insulating and transparent resins, and have a resistivity of at least $10^{12}$ ohm-cm to prevent undue dark decay. The insulating resin becomes electrically active when it contains from about 10 to about 75 percent by weight of the substituted N,N,N',N'-tetraphenyl[1,1-biphenyl]4,4'-diamines corresponding to the foregoing formula. Generally, the hole transport layer has a thickness of from about 5 to about 50 microns, and preferably of from about 10 to about 40 microns.

Examples of the highly insulating and transparent resinous components or inactive binder resinous material for the transport layers include materials such as those described in U.S. Pat. No. 3,121,006, the disclosure of which is hereby totally incorporated herein by reference. Specific examples of suitable organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binder materials are polycarbonate resins having a molecular weight of from about 20,000 to about 100,000 with a molecular weight in the range of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Similar binder materials may be selected for the azo photogenerating layer 37, including those illustrated in U.S. Pat. No. 3,121,006. A preferred class of binder material for the azo photogenerating layer is poly(vinyl acetal).

Imaging members of the present invention exhibit superior xerographic properties. For example, values for dark development potential ($V_{ddp}$) range from $-500$ to $-980$ volts. Acceptable ranges for dark development potential for the imaging members of the present invention are usually about $-600$ to $-900$ volts, with $-800$ volts being preferred. High dark development potentials permit high contrast potentials, which result in images of high quality with essentially no background development.

Imaging members of the present invention also exhibit acceptable dark decay values, of from $-10$ to $-115$ volts per second. Low dark decay values are necessary for developing high quality images, since dark decay measures the amount of charge that dissipates after charging of the photoreceptor. A large difference in charge between exposed and unexposed areas of the photoreceptor results in images with high contrast. Acceptable values for dark decay vary depending on the design of the imaging apparatus in which the imaging members are contained; dark decay may be as high as −100 volts per second, with −50 volts per second being excellent, and −10 to −20 volts per second being preferred.

Residual potential values ($V_R$) for imaging members of the present invention are also superior, ranging from −5 volts to −20 volts. Residual potential is a measure of the amount of charge remaining on the imaging member after erasure by exposure to light and prior to imaging. Residual potentials of −5 to −10 are considered excellent, and values of −10 to −20 are considered acceptable.

Photosensitivity values ($E_{0.5\ ddp}$ at 650 nanometers) of imaging members of the present invention are excellent, and range from 2.4 to 11.9 ergs per square centimeter. Acceptable photosensitivity values depend on the design of the imaging apparatus in which the imaging members are contained; thus, in some instances, values as high as 40 or 50 are acceptable, and values of about 10 are preferred.

The present invention also encompasses a method of generating images with photoconductive imaging members of the invention. The method comprises the steps of generating an electrostatic image on a photoconductive imaging member of the present invention, subsequently developing the electrostatic image, transferring the developed electrostatic image to a suitable substrate, and permanently affixing the transferred image to the substrate. Development of the image may be achieved by a number of methods, such as cascade, touchdown, powder cloud, magnetic brush, and the like. Transfer of the developed image to a substrate may be by any method, including those making use of a corotron or a biased roll. The fixing step may be performed by means of any suitable method, such as flash fusing, heat fusing, pressure fusing, vapor fusing, and the like. Any suitable material such as paper or transparency material used in xerographic copiers and printers may be used as a substrate.

EXAMPLE 2-hydroxy-6-methoxy-3-naphthoic acid (10 g, 0.045 moles) and thionyl chloride (6 g, 0.05 moles) are placed inside a 250 ml three-neck flask containing about 100 ml of methylene chloride. The mixture is stirred and brought to reflux under a nitrogen atmosphere. A catalytic amount of dimethylformamide is added. After about 20 minutes, all of the naphthoic acid is reacted and goes into solution. The solution is cooled to room temperature, and transferred to a 250 ml pressure equalizing funnel. The resulting 2-hydroxy-6-methoxy-3-napthoic acid chloride is then added to a 50 ml methylene chloride solution containing 5.6 g of aniline and 8 g of N,N-diethylaniline. The mixture is heated to reflux for about another 3 hours. After being cooled to room temperature, the mixture is filtered and washed with methanol, yielding 9.1 grams of a crude product after vacuum drying. The crude product is then purified by recrystallization from a mixture of dimethylformamide and methanol, affording 7.8 grams of a creamy while solid, 2-hydroxy-6-methoxy-3-naphthanilide (about 59%), having a melting point of 230° C. and an IR(KBr) of about 1640 cm$^{-1}$ (amide C=O).

The 2-hydroxy-6-methoxy-3-naphthanilide is then used to synthesize 2,7-bis(1'-azo-2'-hydroxy-6-methoxy-3-naphthanilide) fluorenone.

2,7-diaminofluorenone (1.05 g, 5 mmoles) is stirred in 20 ml of 18% hydrochloric acid at about 50°–about 60° C. for about one hour and then at room temperature overnight. The yellow dispersion obtained is then cooled to about 0°–5° C. by an ice-water bath. A cold aqueous solution of NaNO$_2$ is added dropwise over about 15 minutes. After the addition of the NaNO$_2$ solution, the mixture is stirred in an ice bath for another 30 minutes. A clear brown solution results. The dark brown solution is filtered through a medium sintered glass funnel into a 250 ml precooled filtration flask. About 10 ml of fluoboric acid is added to the cold filtrate and yellow precipitate is formed immediately. This mixture is stirred at ice-cold temperature for about 30 minutes. The yellow precipitate is collected by filtration. After washing with cold water, cold methanol and ether, the product is air-dried for about 1 hour, yielding about 1.85 g of a tetrazonium salt.

The salt is dissolved in about 40 ml of cold dimethylformamide inside a 3-neck 1 liter flask in an ice- water bath. A cold dimethylformamide solution containing 3.24 g (11 mmoles) of 2-hydroxy-6-methoxy-3-naphthanilide in 250 ml of dimethylformamide is added into the salt solution over a 20 minute time period. The color of the salt solution changes from orange brown to dark purple. A cold solution of 5 g of NaOAc in 75 ml of water is added slowly into the dimethylformamide solution over a 30 minute time period. The temperature of the dimethylformamide solution is kept below about 7° C. as the NaOAc solution is being added. After the addition is completed, the ice-bath is removed and the product mixture is stirred at room temperature overnight. Crude pigment product is isolated by filtration, preferably through a fine sintered glass funnel. The crude product is then transferred to a 750 ml beaker and stirred with 250 ml of water at about 81° C. for about 2 hours. The pigment is collected by filtration and subjected to a second water washing (overnight) in a similar fashion. The pigment is then washed with about 250 ml of dimethylformamide at 81° C. for 2½ hours, overnight, and then 2½ hours. After the third dimethylformamide, wash, the pigment product is stirred in about 250 ml of acetone for 2½ hours and then about 250 ml of ether for about 2½ hours to remove residual high boiling solvents, and is then dried inside a vacuum oven at about 70° C. overnight. A dark blue pigment product, weighing about 3.34 grams, identified as 2,7-bis(1'azo-2'-hydroxy-6'-methoxy-3'-naphthanilide)fluorenone is obtained (82%). The pigment exhibits the following properties:

Melting point: The biazo compound is not observed to melt at temperatures as high as 300° C. after 10 minutes, at which time the test is terminated.

IR(KBr): 1718 (fluorenonoe C=O) and 1680 cm$^{-1}$ (amide C=O).

A photogenerating pigment dispersion is prepared by first dissolving 52.8 milligrams of poly(vinyl formal) or poly(vinyl butyral) in 10 milliliters of tetrahydrofuran in a 1 ounce brown bottle. 211.2 mg of 2,7-(1-azo-2'-hydroxy-6'-methoxy-3'-napthanilide)fluorenone and approximately 90 grams of steel shot (⅛ inch diameter, #302 grade) was added to the polymer solution. The brown bottle is then placed in a Red Devil Paint Conditioner (Model 5100X) and shaken for 30 minutes. A dispersion results, which is coated onto a 0.006 inch thick 7.5 inch by 10 inch aluminum substrate by using a Gardner Mechanical Drive Film Application with a 6 inch wide Bird Film Applicator (0.5 mil wet gap) inside a humidity controlled glove box. The relative humidity inside the glove box is controlled by dry air and is maintained at less than 25 percent at room temperature. A photogenerating layer results and is air dried for approximately 30 minutes, and vacuum dried at 100° C. for approximately 1 hour before further coating. The thickness of the photogenerating layer is found to be approximately 0.5 micron as estimated from TEM micrographs.

A transport layer composed of about 60 percent Makrolon ® polycarbonate resin, available from Farbenfabricken Bayer AG, mixed with about 40 percent N,N'-bis(3-methylphenyl)-1,1'-biphenyl-4,4'-diamine is then formulated. A solution comprising 4.2 grams of Makrolon ®, 2.8 grams of the diamine, and 31 milliliters of methylene chloride is placed in an amber bottle and dissolved. The charge transport layer is obtained by coating the solution onto the above azo photogenerating layer using a 5 mil wet gap Bird Film Applicator to a thickness of approximately 27 microns. A photoconductive imaging member results and is air dried for 1 hour, and vacuum dried for 6 to 20 hours.

The imaging member exhibits the xerographic properties summarized in the table below.

TABLE

| CGL binder | PVF[a] | PVB[b] |
|---|---|---|
| Corotron (KV) | −5.4 | −5.2 |
| $V_{ddp}$ (V) | −700.0 | −850.0 |
| Dark Decay (V/sec) | −65.0 | −35.0 |
| $V_R$ (V) | −5.0 | −20.0 |
| $E_{0.5(ergs/cm2)}$ at 600 nm | 2.4 | 3.1 |

[a]from Scientific Polymer Products, formal content 82%, hydroxy content 6%, acetate content 12%;
[b]from Fuji Xerox, tradename BM-1, butyral content 65%, hydroxy content 35%/

Figure 4:
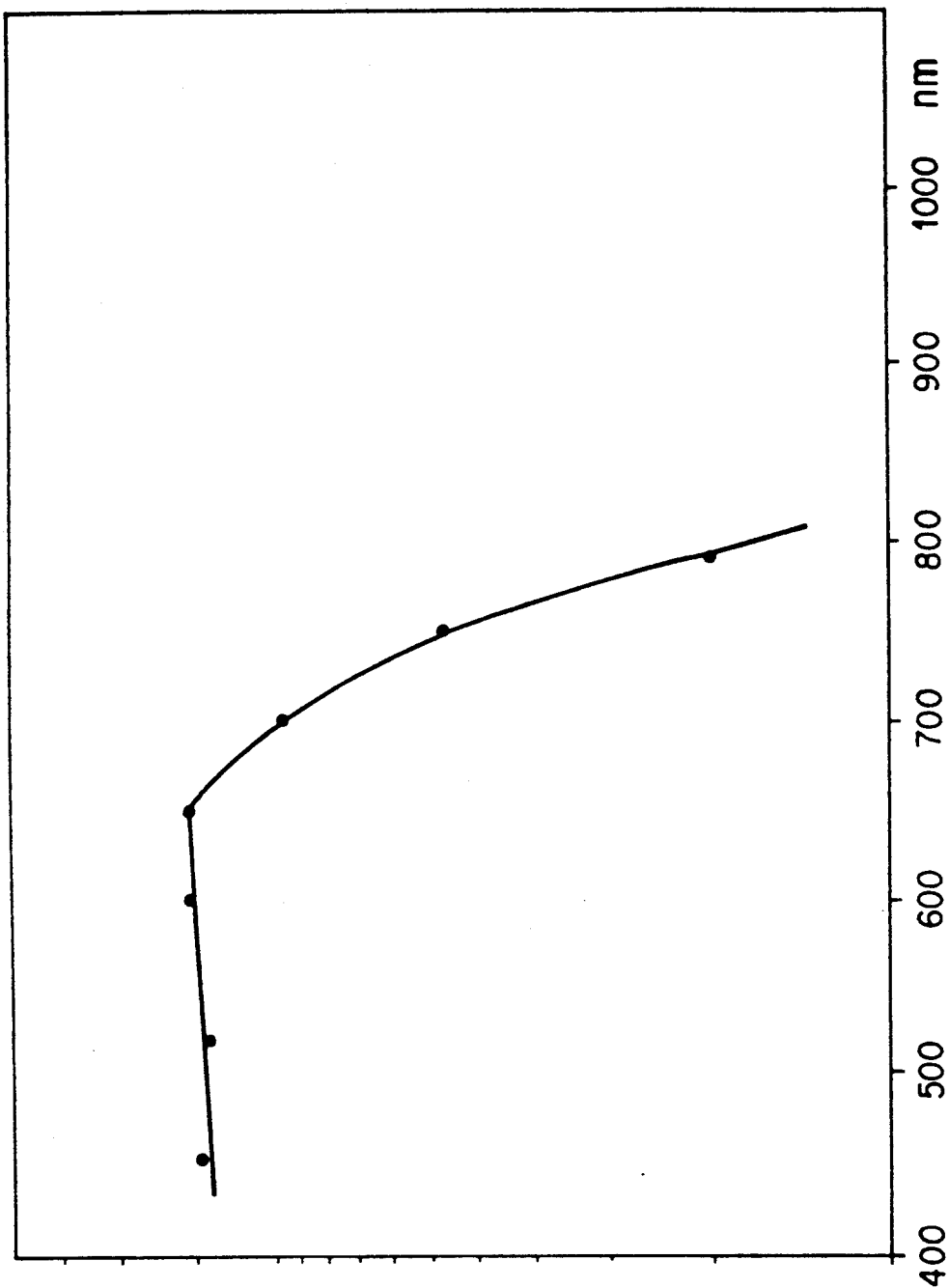
FIG. 4 is a graph indicating spectral response of an azo pigment of the present invention.

The spectral response curve of the PVF device is depicted in FIG. 4. The data shows that the device is highly sensitive and panchromatic in the visible region. The photosensitivity maximum is at 650 nm, rendering the device useful in printers having HeNe laser (633 nm) and LED (660 nm) image-bar light sources.

While the invention has been described with reference to the structures and embodiments disclosed herein, it is not confined to the details set forth, and encompasses such modifications or changes as may come within the purpose of the invention.

What is claimed is:

1. A photoconductive imaging member comprising a substrate, a charge transport layer, and a photogenerating layer comprising at least one pigment of the formula:

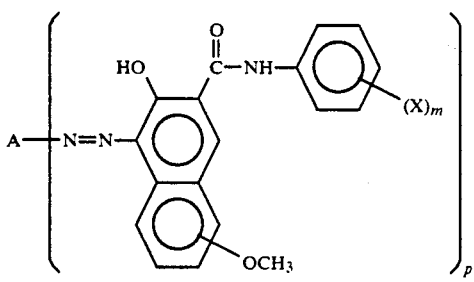

wherein A is a residual structure of an aromatic amine, p is a positive integer, m is an integer from 0 to 4 and X is an organic or inorganic substituent.

2. The photoconductive imaging member of claim 1, wherein X is at least one member selected from the group consisting of F, Cl, Br, $NO_2$, CN, OH, $NH_2$, $OCH_3$, $OCH_2CH_3$, $CF_3$, alkyl groups and aromatic groups.

3. The photoconductive imaging member of claim 1, wherein the photogenerating layer is situated between the substrate and the charge transport layer.

4. The photoconductive imaging member of claim 1, wherein the charge transport layer is situated between the substrate and the photogenerating layer.

5. The photoconductive imaging member of claim 1, wherein the photogenerating layer has a thickness of from about 0.05 to about 10 microns.

6. The photoconductive imaging member of claim 1, wherein the photogenerating layer has a thickness of from about 0.1 to about 3 microns.

7. The photoconductive imaging member of claim 1, wherein the pigment is dispersed in a resinous binder in an amount of from about 5 percent by weight to about 95 percent by weight.

8. The photoconductive imaging member of claim 7, wherein the resinous binder comprises a material selected from the group consisting of polyester, polyvinyl butyral, a polycarbonate, and polyvinyl formal.

9. The photoconductive imaging member of claim 1, wherein the position of the methoxy group on the second ring of the naphthanilide is selected from the group consisting of the 5, 6, 7 and 8 positions.

10. The photoconductive imaging member of claim 9, wherein m is 0.

11. The photoconductive imaging member of claim 1, wherein said aromatic amine is selected from the group consisting of 2,7-diaminofluorenone, 2,7-diamino-3,6-dichlorofluorenone, tris(p-aminophenyl)amine, bis(p-aminophenyl)phenylamine, 2-nitro-4,4'-diaminophenylamine, bis(p-aminophenyl)methylamine, bis(p-aminophenyl)amine, 1,5-diaminonaphthalene, 2,7-diaminonaphthalene, 2,7-diaminobenzothiophene sulfone, 2,7-diamino-3,6-dichlorobenzothiophene sulfone, 4,4'-diaminobiphenyl, 3,3'-dichloro-4,4'-diaminobiphenyl, 3,3'-dimethoxy-4,4'-diaminobiphenyl, 4,4'-diaminoterphenyl, 4,4'-diaminoazobenzene, 4,4'-diaminostilbene, 3,6-diaminocarbazole, N-ethyl-3,6-diaminocarbazole, 4,4'-diamino-1,1'-dianthraquinonylamine, 1,5-diaminoanthraquinone, 2,7-diaminoanthraquinone, 2,6-diaminoanthraquinone, 2,4,7-triaminofluorenone, 2,4,5,7-tetraaminofluorenone, 2,5-bis(4-aminophenyl)-1,3,4-oxadiazole, 2,7-diaminoxanthone, 2,7-diaminothioxanthone, 2,7-diaminofluoren-9-thione, 2,7-diaminobenzothiophene, N-(p-aminophenyl)-3,6-diaminocarbazole, 3,6-thioxanthenediamine-10,10-dioxide, 2,4,7-triaminofluorene-9-thione, N,N,N',N'-tetrakis(aminophenyl)-p-phenylenediamin, N,N,N',N'-tetrakis(aminophenyl)-4,4'-diaminobiphenyl, 2,7-diaminofluorene, N,N'-bis(aminophenyl)-3,4,9,10-perylene-tetracarboxylic diimide, and N,N'-bis(aminophenyl)-1,4,5,8-naphthalene-tetracarboxylic diimide.

12. The photoconductive imaging member of claim 10, wherein said pigment is 2,7-bis(1'-azo-2'-hydroxy-Y-methoxy-3'-naphthanilide)fluorenone, wherein Y is selected from the group consisting of 5', 6', 7' and 8'.

13. The photoconductive imaging member of claim 1 wherein the imaging member has a photosensitivity of between about 2.4 to about 50 ergs/cm² at about 650 nanometers.

14. A method of imaging comprising:
generating an electrostatic image on a photoconductive imaging member, said imaging member comprising a supporting substrate, a charge transport layer and a photogenerating layer comprising at least one pigment of the formula:

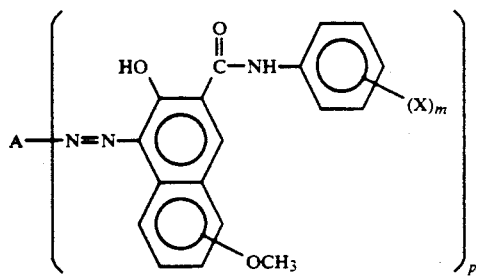

wherein A is a residual structure of an aromatic amine, p is a positive integer, m is an integer from 0 to 4 and X is an organic or inorganic substituent.

developing the electrostatic image;

transferring the developed electrostatic image to a suitable substrate; and permanently affixing the transferred image on the substrate.

15. The method of imaging according to claim 14, wherein X is at least one member selected from the group consisting of F, Cl, Br, NO$_2$, CN, OH, NH$_2$, OCH$_3$, OCH$_2$CH$_3$, CF$_3$, alkyl groups and aromatic groups.

16. The photoconductive imaging member of claim 1 having improved sensitivity in the light emitting diode wavelength range.

17. A method of imparting photosensitivity in the light emitting diode wavelength range to a photoconductive imaging member comprising incorporating into said photoconductive imaging member a photogenerating layer comprising at least one pigment of the formula:

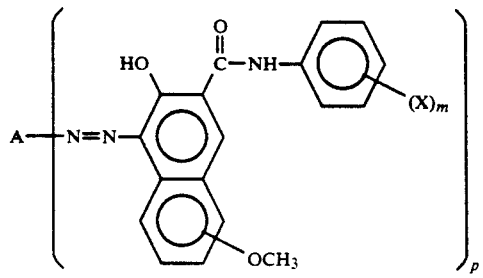

wherein A is a residual structure of an organic amine, p is a positive integer, m is an integer from 0 to 4 and X is an organic or inorganic substituent.

* * * * *